W. C. HYZER.
RECLAMATION OF PURIFIED METAL.
APPLICATION FILED APR. 11, 1906.
943,248.
Patented Dec. 14, 1909.
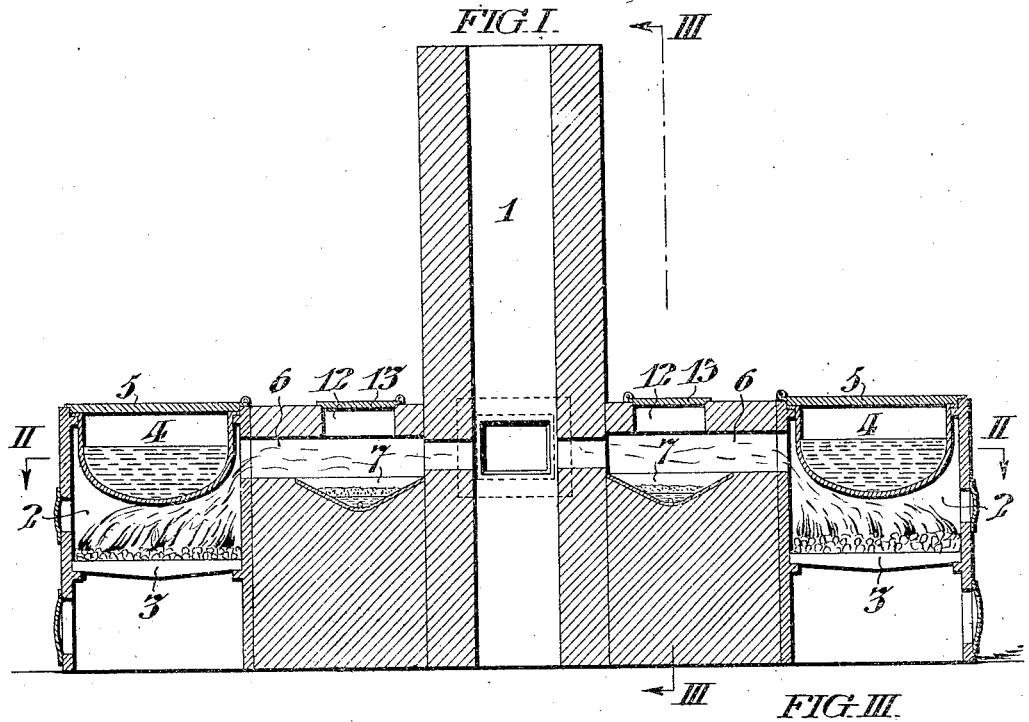
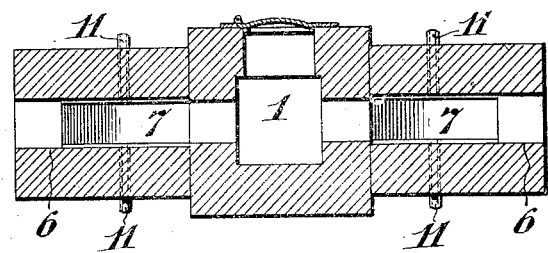
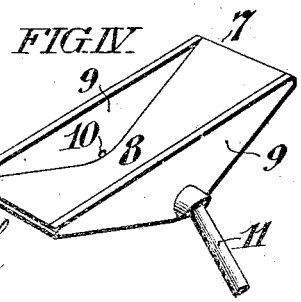
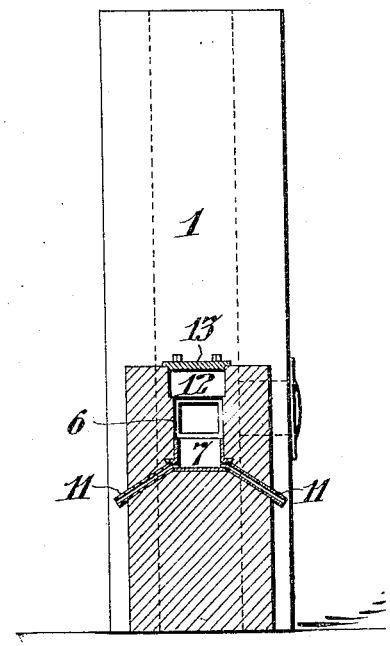
WITNESSES:
INVENTOR:
WILLIAM C. HYZER,

UNITED STATES PATENT OFFICE.

WILLIAM C. HYZER, OF PHILADELPHIA, PENNSYLVANIA

RECLAMATION OF PURIFIED METAL.

943,248.  Specification of Letters Patent.  Patented Dec. 14, 1909.

Application filed April 11, 1906. Serial No. 311,026.

*To all whom it may concern:*

Be it known that I, WILLIAM C. HYZER, of Philadelphia, in the county of Philadelphia and State of Pennsylvania, have invented certain new and useful Improvements in the Reclamation of Purified Metal, whereof the following is a specification, reference being had to the accompanying drawings.

My improvements relate to the reclamation of purified metal in a furnace of the class employed in re-melting type metal preparatory to its being recast, but it is applicable to other melting furnaces or processes in which metal is melted in order to remove from the molten metal, preparatory to its casting, the impurities which tend to rise and form a scum on the surface and in which it is desirable to reclaim, so far as possible, all the purified metal. In such operations, and particularly in the melting of type metal, it has heretofore been customary to employ furnaces of the general character which I have disclosed, and after the metal has been rendered molten therein, to skim off with a ladle the impurities, which rise to the surface as dross. The scum or dross thus removed always contains some metal mingled with it; but heretofore the difficulties involved in reclaiming the metal from the removed scum have been such as to render it uneconomical to attempt to reclaim it. Consequently, it has been considered worthless and has been discarded, resulting in a considerable waste of metal. According to my invention, the ordinary melting furnace is provided with a supplemental dross melting pot heated as is a reverberatory furnace and especially adapted to reclaim the metal from the scum.

I have shown in the drawings and will now describe, an embodiment of my invention which I have found convenient and useful, premising that other arrangements may be devised to embody the idea or principle of procedure which constitutes the basis of my invention.

In said drawings, Figure I, is a vertical longitudinal sectional view of a double melting furnace conveniently adapted for my invention. Fig. II, is a plan sectional view of a portion of said furnace, taken along the line II, II, in Fig. I. Fig. III, is a vertical transverse section of the same taken along the line III, III, in Fig. I. Fig. IV, is a perspective view in detail of the supplemental dross melting pot.

Referring to the drawings, 1, is a stack which may be employed in connection with any convenient number of melting furnaces, of which two are shown in the drawings. I will describe the furnace which appears at the right of the stack, in Fig. II, the other furnace to the left being similar in all respects. The melting furnace 2, is provided with a suitable grate 3, over which is suspended the melting pot 4, protected by a hinged lid 5. Extending from the furnace 2, above the grate 3, is a horizontal flue 6, through which the products of combustion are drawn from the grate beneath the melting pot 4, to the stack 1. Thus far I have described a construction of melting furnace common in the art.

In order to practice my invention, I insert within the flue 6, a supplemental dross melting pot 7, the shape of which more clearly appears in the drawing which constitutes Fig. IV, from which it will be observed that this pot is formed by combining a bottom wall 8, which gently inclines longitudinally from its opposite ends downwardly toward its center so as to form a trough shaped vessel, with two vertical side walls 9, 9. The pot 7, is provided with one or more outlets 10, which lead through the vertical walls near their lowest point. Connected with each outlet 10, is a sloping discharge pipe 11, as best shown in Figs. II, and III. Two such outlets with their discharge pipes are shown in the drawings. One is sufficient, and if two are present one or the other may be closed, so that they may be employed alternately.

As best shown in Fig. I, the pot 7, is supported lengthwise in the bottom of the horizontal flue 6, and for access to it an opening 12, is provided in the top of said flue, and protected by a hinged lid 13. The pipes 11, extend through the inclosing brickwork and deliver the molten contents of the pot 7, to any convenient receptacle placed beneath their lower ends.

In practicing my invention I proceed as follows: The type metal, or other metal to be reclaimed from its impurities, is placed in the main melting pot 4, and melted in the usual way. The scum rises to the surface and, as the surface of the metal in the melting pot is slightly cooler than the rest, this scum carries with it a certain amount of metal, especially if one metal is alloyed with other metals possessing a higher melting point. From time to time the scum is removed by a ladle, and as hereinbefore explained this scum has heretofore been discarded as worthless dross. According to my invention the dross, after removal from the molten metal in the pot, is placed in the supplemental melting pot 7. Here it is again subjected to intense heat under different circumstances. The construction of this part of the furnace approximates the hearth of a reverberatory furnace, that is to say, the heat is reflected upon the supplemental melting pot from above, and its contents are exposed to very little oxidation. Furthermore the heating here is from the surface down and not from the bottom up, as in the main melting pot. As the result of this supplemental operation the metal remaining in the scum is again melted and, precipitating through the mass of impurities, passes out at the bottom through the outlet 10, and discharge pipe 11, at the bottom of the vertical wall of the supplemental melting pot, and is received in a suitable receptacle and is thus recovered, In passing out through the aperture 10, the metal does not carry with it any appreciable quantity of impurities, as these floating upon the surface, settle upon the gently sloping bottom, and permit almost pure metal to trickle off through the openings in the vertical sides. From time to time the accumulated impurities are scraped out of the pot 7.

The construction of the supplemental dross melting pot which I have described is a particularly efficacious one especially for the reclamation of type metal from its dross. The combination of the gently sloping bottom with the vertical sides and an opening near the lowest portion of the vertical sides much facilitates the running off of the re-melted metal without carrying with it any of the impurities from which it is desirable to thus reclaim the metal.

Having thus described my invention, I claim:

1. A furnace for melting metal and reclaiming it from its impurities which comprises a grate and combustion chamber, a main melting pot provided with a lid and situated within the combustion chamber; a supporting framework for the combustion chamber and melting pot, so closed that the removal of the lid of the melting pot affords no escape for the products of combustion; a horizontal flue leading to a stack through which the products of combustion are led away from the combustion chamber; and a supplemental dross melting pot interposed within the bottom of said horizontal flue, said supplemental melting pot being provided with a discharge pipe at the bottom, and said flue being provided with an opening directly over the supplemental melting pot, whereby the dross from the main melting pot may be readily skimmed and transferred to the supplemental melting pot wherein the metal is re-melted and reclaimed.

2. A dross melting furnace comprising a combustion chamber, a horizontal flue, and a dross melting pot inserted on the lower side of said horizontal flue and provided with vertical walls and also with gently sloping walls, and with an aperture in a vertical wall having its bottom flush with the bottom of the melting pot.

3. The process of reclaiming purified metal from dross, which consists in placing dross in a suitable receptacle, and there subjecting it to the reverberatory action of heated products of combustion, led over the top of the dross, whereby the dross is heated from the top downward, and the melted metal permitted to escape through an aperture in the bottom of the receptacle.

In testimony whereof, I have hereunto signed my name, at Philadelphia, Pennsylvania, this 10th day of April 1906.

WILLIAM C. HYZER.

Witnesses:
   JAMES H. BELL,
   E. L. FULLERTON.